Jan. 25, 1966 R. OHRNBERGER 3,231,046
LUBRICATING SYSTEM FOR MACHINE TOOLS AND THE LIKE
Original Filed May 13, 1960 2 Sheets-Sheet 1
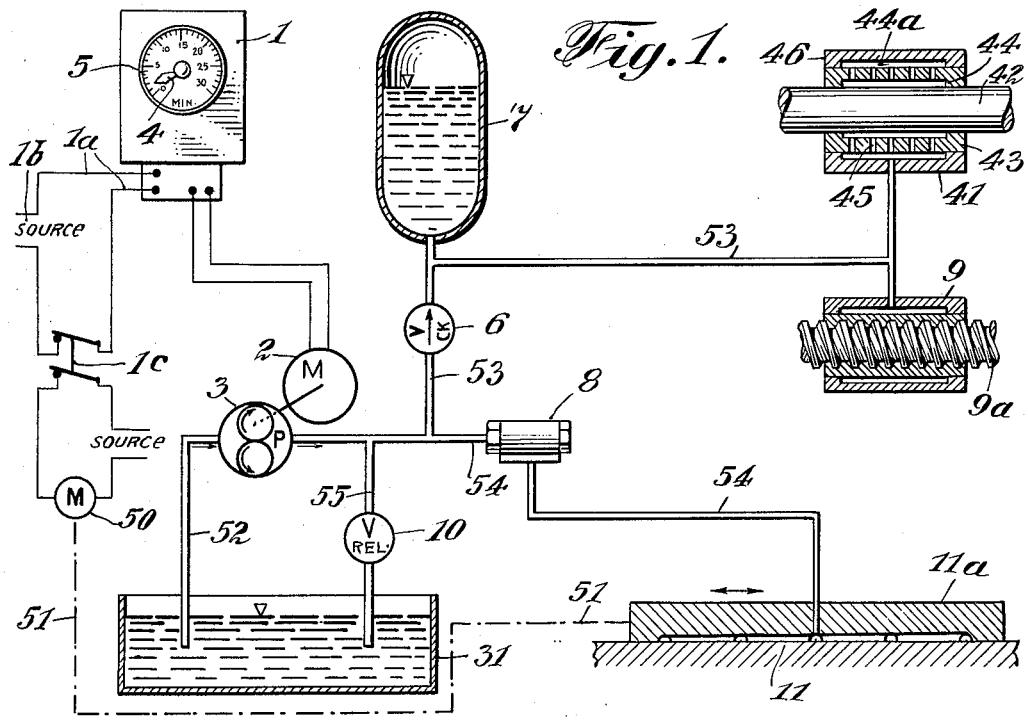
INVENTOR
Robert Ohrnberger
BY Michael S. Striker
his ATTORNEY

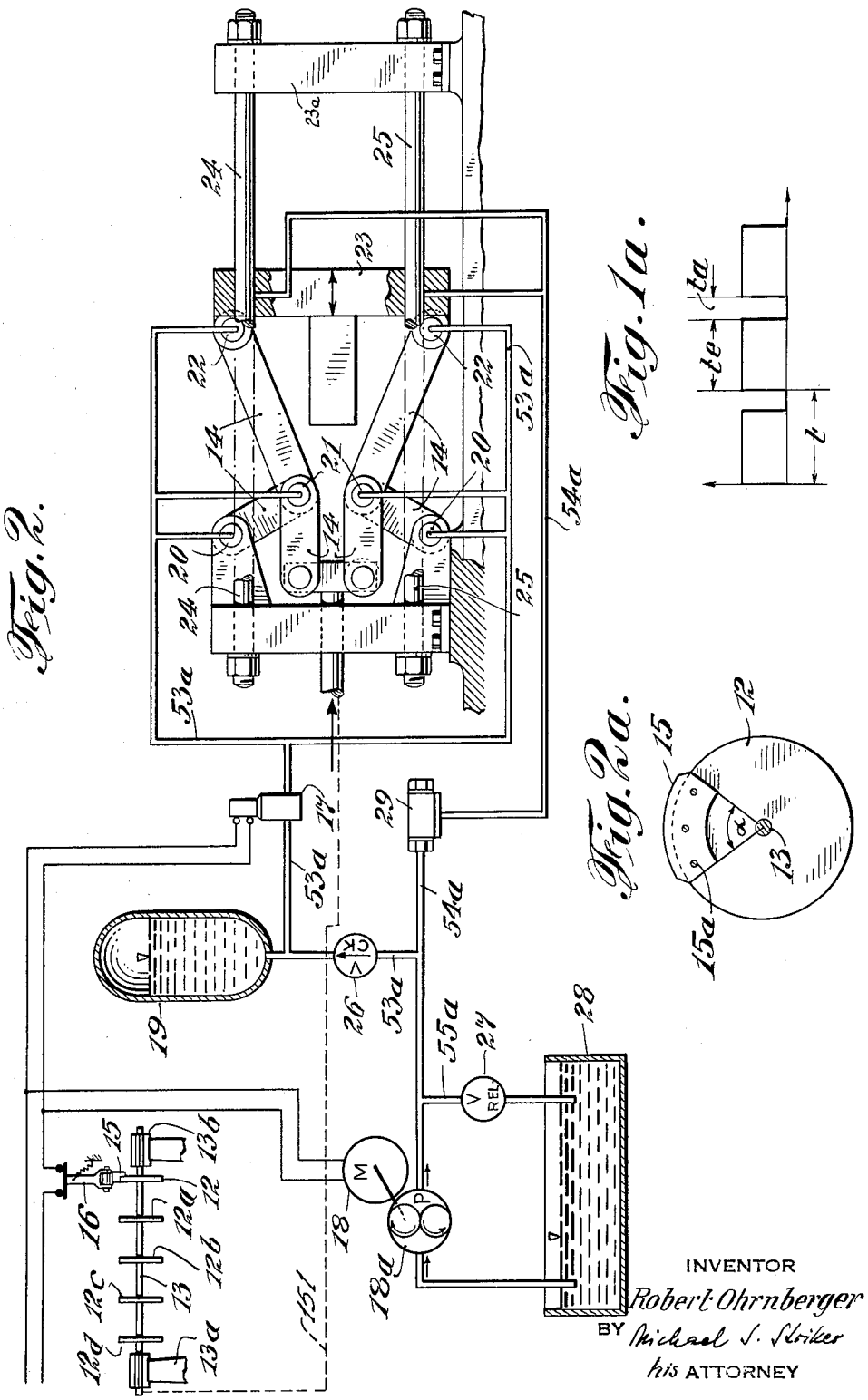

United States Patent Office 3,231,046
Patented Jan. 25, 1966

3,231,046
LUBRICATING SYSTEM FOR MACHINE TOOLS
AND THE LIKE
Robert Ohrnberger, Bad Homburg vor der Hohe, Germany, assignor to Vereinigte Werkzeugmaschinenfabriken A.G., Frankfurt am Main, Germany
Continuation of application Ser. No. 29,087, May 13, 1960. This application Dec. 7, 1962, Ser. No. 245,346
Claims priority, application Germany, June 3, 1959,
G 27,199
8 Claims. (Cl. 184—6)

The present application is a continuation of my application Serial No. 29,087, filed May 13, 1960, now abandoned and entitled "Lubricating System for Machine Tools and the Like."

The present invention relates to lubricating systems in general, and more particularly to an automatic or semi-automatic lubricating system for machine tools and the like.

In many types of machines, and particularly in machine tools, one or more groups of relatively movable components require simultaneous lubrication, either continuously or at certain predetermined intervals. Heretofore, such simultaneous lubrication was carried out by one or more central lubricators. Periodically recurring simple lubrication is carried out with the help of hand-operated grease guns, oil cans or the like. However, whenever certain relatively movable parts require constant lubrication, the lubricator normally comprises an electrically operated pumping device.

Depending upon the nature of operation of a machine and on the nature of relative movement between two or more of its components, certain parts of the machine must be lubricated for different periods of time. For example, meshing components require constant lubrication particularly if they must bring about a vibration-dampening effect under periodically recurring loads. On the other hand, guideways and like components require only sporadic lubrication.

An important object of the present invention is to provide a lubricating system which may be utilized for permanent and/or for intermittent lubrication of relatively movable components of machine tools and the like.

Another object of the invention is to provide a lubricating system of the above outlined characteristics which may be operated in a fully automatic way and in rhythm with movements of component parts which require lubrication.

A further object of the present invention is to provide a lubricating system for one or more groups of relatively movable components in machine tools and the like in which a single power source may control and bring about the flow of lubricant to all parts of the machine.

A concomitant object of the instant invention is to provide a lubricating system of the above outlined type in which the duration of intervals at which a lubricant is supplied to certain relatively movable components of a machine may be varied at will, which is capable of delivering metered quantities of lubricant to selected relatively movable components, and which may be readily installed in nearly all types of machine tools without requiring any, or by requiring only slight modifications in the construction of such machines.

Still another object of the invention is to provide a lubricating system of the above outlined characteristics which, once installed and adjusted, requires no further attention from an operator.

An additional object of the present invention is to provide a lubricating system for continuous or intermittent delivery of lubricant to one or more groups of relatively movable components in a machine which may be simultaneously utilized to control the operation of bearings and similar components of the machine.

A further object of the invention is to provide a lubricating system of the above outlined type which consists of a small number of component parts, which may be adjusted to deliver lubricant at the optimum rate depending on the nature of movement and dimensions of relatively movable components, and which can be readily adapted for automatic or semi-automatic operation.

With the above objects in view, the invention resides in the provision of a lubricating system which comprises essentially a source of lubricant, conduit means connecting the source with one or more groups of relatively movable components forming part of a machine tool or any other machine, hydraulic pump means in the conduit means adapted to deliver lubricant from the source to the relatively movable components, and means for intermittently actuating the pump means so that the latter may deliver lubricant through the conduit means. When a selected group of relatively movable components require constant lubrication, the system may comprise a pressure tank which is installed between the pump means and the selected group of components and which may store sufficient lubricant during each successive operation of the pump means so that it may continuously deliver lubricant to the selected group of components for a period of time at least as long as the length of intervals between two successive operations of the pump means. On the other hand, if another selected group of relatively movable components requires intermittent lubricating and must intermittently receive metered quantities of lubricant, the system may comprise suitable metering means installed between the components and the pump means. Such metering means may be responsive to pressures generated by the pump means or it may comprise an electromagnetic or like valve which opens for a fixed period of time and permits predetermined quantities of lubricant to pass toward the relatively movable components.

According to another feature of my invention, the pump means may be operatively connected with one or more groups of relatively movable components, for example, by being controlled by suitable switch means which simultaneously controls the circuit of electric means utilized to bring about movements of such components. The system then comprises suitable timer means, such as an electric time clock or a rotary cam, which can actuate the pump means in rhythm with the movements of the components. Such arrangement is particularly useful in certain machines which utilize intermittently movable components, for example, the toggle mechanism which closes and opens the dies in an injection molding press or the like.

The novel features which are considered as characteristic for the invention are set forth in particular in the appended claims. The invention itself, however, both as to its construction and its method of operation, together with additional objects and advantages thereof, will be best understood from the following detailed description of three specific embodiments when read in connection with the accompanying drawings, in which:

FIG. 1 is a schematic view of a lubricating system which is utilized for permanent lubrication of a first group of relatively movable components and for periodic lubrication of a second group of components;

FIG. 1a is a diagram illustrating the operating cycle of a pump utilized in the lubricating system of FIG. 1;

FIG. 2 is a schematic view of a modified system which, too, is utilized partly for permanent and partly for intermittent lubrication of certain components, but which is operated in rhythm with movements of certain components;

FIG. 2a is enlarged front elevational view of a cam disc which forms part of the actuating means for the pumping device in the system of FIG. 2;

FIG. 3 is a schematic view of a further modification according to which the system is utilized for delivery of measured quantities of lubricant to a specific component of a machine tool or the like; and FIG. 4 is a sectional view of the bearing 34 of FIG. 3, taken in a plane which is normal to the axis of shaft 38.

Referring now in greater detail to the illustrated embodiments and first to FIG. 1, there is shown a lubricating system which comprises a power source here shown as a hydraulic gear pump 3 which is coupled with and may be driven by an electric motor 2. This motor operates the pump at certain intervals and is controlled by actuating means in the form of an electric timer 1 which is installed in the circuit of the pump assembly 2, 3. The timer 1 is actually an electric time clock which comprises an indicator 4 and a graduated scale 5 calibrated in minutes, the indicator being adjustable along the scale to thereby vary the length of intervals at which the electric circuit of the pump assembly 2, 3 is completed and/or to vary the length of periods during which the pump 3 is actuated by its motor 2.

For example, and as shown in the diagram of FIG. 1a, the time interval $t$ representing a complete cycle during which the pump 3 is first actuated and thereupon arrested consists of an "on" interval $te$ during which a switch (not shown) in the timer 1 actually completes the circuit of the motor 2 so that the pump 3 delivers lubricant from a schematically illustrated source 31, and an "off" interval $ta$ during which a pump 3 is idle. The arrangement may be such that the timer 1 can control the duration of the interval $te$ and/or of the interval $ta$. The conductors 1a form part of the electric circuit common to the timer 1 and motor 2, and lead to a current source 1b as well as to a normally closed switch 1c. The switch 1c simultaneously completes a second electric circuit which includes a motor 50 utilized for imparting, say, reciprocating movements to a machine component 11a which is slidable along a complementary component 11. The operative connection between the motor 50 and the driven component 11a is indicated schematically by a phantom line 51. For example, the component 11 may constitute the bed of a machine tool and is formed with guideways for the reciprocating component 11a which latter may represent a carriage or the like. Thus, the circuit of the timer 1 is completed when the switch 1c completes the circuit of the motor means 50 which brings about a given movement of one or more components of that machine in which the lubricating system is installed. The switch 1c may constitute the main switch of a machine tool; it may start a motor which brings about linear or rotary movements of one or more machine components; or it may be utilized to trigger rapid movements of a normally slowly running component, i.e., such movements which render proper lubrication even more acute. The pump motor 2 begins to actuate the pump 3 as soon as the switch 1c is tripped, and the timer 1 thereupon automatically regulates the operation of the motor 2 so that the pump is alternately driven (interval $te$) and arrested (interval $ta$).

The lubricant delivered by pump 3 through a first conduit 52 and a second conduit 53 may flow through a check valve 6 which is installed in the conduit 53 and into pressure tank 7 which latter, too, is installed in the conduit 53 and stores sufficient quantities of lubricant so that it may constantly deliver the same through the conduit 53 and to two groups of relatively movable components 41, 42, and 9, 9a, respectively. A third conduit 54 connects the pump 3 with the aforementioned group of machine components 11, 11a and contains a metering device 8, e.g., a pressure-responsive piston valve of any known design which, in response to pressure generated in conduit 54 by the pump 3, intermittently delivers metered quantities of lubricant into the oil groove between the components 11, 11a.

The relatively movable meshing components 9, 9a represent a worm drive which requires uninterrupted lubrication. The components 42, 41 represent a revolving spindle and its bearing which, too, requires constant lubrication. As explained hereinabove, the components 11, 11a are lubricated at intervals ($te$), that is, when the pump 3 is in actual operation. However, the pressure tank 7 stores sufficient lubricant during the intervals $te$ so that it also delivers lubricant during the intervals $ta$ i.e. the components 9, 9a and 41, 42 are lubricated without any interruption. As long as the switch 1c remains in the position of FIG. 1, the timer 1 alternately starts and arrests the motor 2 so that the metering device 8 delivers lubricant at fixed intervals to the components 11, 11a.

The common section of conduits 53, 54 communicates with a return line 55 which contains an overflow valve 10 and permits return flow of lubricant to the source 31 whenever the pressure in conduits 53, 54 reaches a maximum permissible magnitude.

The lubricant delivered to certain bearings may perform a lubricating as well as a stabilizing action. For example, it may dampen the vibrations of a revolving spindle. As is shown in FIG. 1, the bearing 41 for the spindle 42 comprises an inner sleeve-like member 43 and an outer sleeve-like member 46. The inner surface of the member 43 is formed with an annular recess 44 and a similar recess 44a is formed in the inner surface of the member 46. The recesses 44, 44a communicate through ducts 45 formed in the sleeve-like member 43, and the recess 44a communicates with the conduit 53. Any vibrations of the spindle 42 are dampened by the internal friction of lubricant in the recess 44 and also because of resistance met by lubricant during the flow through the narrow ducts 45. Thus, the lubricant insures vibration-free rotation of a driven component and simultaneously lubricates all relatively movable components of a machine tool or the like.

FIG. 2 illustrates a modification of the lubricating system. The timer 1 is replaced by a cam disc 12 which is carried by a revolving shaft 13 mounted in suitable bearings 13a, 13b. This shaft carries a series of additional cam discs 12a, 12b, 12c, 12d, each of which may be utilized for controlling the movements of certain components in a machine tool or the like. The shaft 13 is operatively connected to the toggle mechanism 14 in such a way that shaft 13 completes a revolution whenever the toggle mechanism 14 representing a group of relatively movable components completes a predetermined operation. The operative connection between the shaft 13 and the toggle mechanism 14 is indicated schematically by a phantom line 151.

The disc 12 carries a segmental cam 15 (see FIG. 2a) which periodically trips a spring-biased switch 16 adapted to complete the circuit of an electric pump motor 18 and of an electromagnetic valve 17. The latter is of well known construction and may comprise, for example, a shiftable member adapted to open the conduit 53a which leads from the pump 18a to a series of relatively movable component groups 20, 21, 22 forming part of the toggle mechanism 14.

The conduit 53a further contains a check valve 26 and a pressure tank 19 which is disposed between the valves 26 and 17 and stores sufficient quantities of lubricant to deliver lubricant to component groups 20–22 whenever the valve 17 permits the flow of lubricant through the conduit 53a. By proper selection of the angle of the segmental cam 15 and by proper positioning of this cam on the disc 12, the operator may control the length of intervals during which the valve 17 opens the conduit 53a so that the component groups 20–22 may be lubricated during a predetermined stage in the operation of the toggle mechanism 14. It will be noted that the cam 15 is removably secured to the disc 12 by a series of screws 15a or the like.

A conduit 54a connects the pump 18a with a further component 23 of the toggle mechanism 14 and contains a metering device 29 which is responsive to pressures generated by the pump 18a so as to deliver a metered quantity of lubricant to the component 23 whenever the pump 18a is operated as a result of engagement between the cam 15 and the switch 16. For example, the component 23 may constitute a crosshead which slides along the tie rods 24, 25 toward a stationary crosshead 23a, it being assumed that the toggle mechanism 14 forms part of an injection molding press.

A return line 55a connects the conduits 53a, 54a with the source 28 and contains an overflow valve 27 which opens when the pressure in conduits 53a, 54a reaches a given maximum magnitude. At least a portion of conduits 53a, 54a consists of flexible material.

The components 20, 21 and 22 represent pivot axles which articulately connect the links of the toggle mechanism 14. These pivot axles are received in suitable bearing sleeves and are subjected to very high stresses when the links perform comparatively small angular movements with respect thereto. When the links are in actual motion, the pressure between the bearing sleeves and the pivot axles 20, 21, 22 is often too high to permit the formation of a satisfactory film of lubricant. Therefore, the lubricant is delivered in impulses (conduit 53a) to such portions of the bearing sleeves which are subjected to lesser stresses. The valve 17 opens the conduit 53a when the movable crosshead 23 begins its movements toward the stationary crosshead 23a, i.e. when the components of the toggle mechanism 14 are subjected to initial and comparatively low stresses. The mounting of the cam 15 and the connection between the shaft 13 and toggle mechanism 14 is such that the valve 17 is operated in synchronism with movements of the crosshead 23 so that the system will inject lubricant at predetermined intervals and in predetermined stages of the movement of crosshead 23 toward the crosshead 23a.

Referring now to FIG. 3 there is shown a lubricating system which comprises a pump assembly 56, 57 whose motor 56 is in the electric circuit of an electromagnetic valve 35, this valve being installed in the conduit 53 leading to two relatively movable components 34, 38. The conduit 53 contains a check valve 36 and a pressure tank 37. The circuit of the motor 56 and valve 35 may be completed by a switch 32 which latter may simultaneously complete the circuit (conductors 33) of a motor (not shown) adapted to initiate the operation of a machine component, for example, the spindle of a boring machine.

The switch 32 may be formed as a pushbutton which is then installed on the instrument panel of a machine tool or the like and when depressed, causes the motor 56 to operate the pump 57 whereby the latter delivers a certain quantity of lubricant to the pressure tank 37. The switch 32 also causes the valve 35 to open and to permit flow of lubricant to the components 34, 38. The check valve 36 prevents return flow of lubricant from the tank 37. The valve 35 permits the flow of lubricant as long as the switch 32 is depressed, i.e. as long as the circuit of the motor 56 is completed.

In the embodiment of FIG. 3, the component 34 assumes the form of a bearing which exerts a clamping action upon the rotary or axially shiftable spindle 38. Thus, when the spindle is arrested, the bearing 34 clamps it against any movement and permits a rotation or axial displacement of the spindle only when it receives lubricant through the conduit 53. It is assumed that the spindle 38 is mounted for axial movements in the bearing 34 and, when not reciprocated, is actually locked by the bearing. The inner surface of the bearing is formed with communicating grooves 39 which may receive lubricant from the conduit 53. The bearing may consist of several parts, e.g., parts 134, 135 and 136, which are expanded by the pressure of lubricant in the grooves 39 so that the bearing releases the spindle and the latter may be reciprocated by a motor or the like as soon as the switch 32 completes the circuit of the valve 35 and the motor 56, the circuit of the spindle motor.

It will be readily understood that the switch 32 may be replaced by a timer such as the clock 1 of FIG. 1, or by a cam disc such as the member 12 of FIG. 2. The lubricating system of FIG. 3 will then operate in a fully automatic way and will intermittently deliver measured quantities of lubricant to the components 34, 38 by simultaneously starting the motor which reciprocates the component 38. It is equally possible to reverse the operation, i.e. to start the motor 56 in dependence on the operation of one or more relatively movable components in a machine tool so that the operation of the lubricating system will depend on the operation of components which require lubrication. To achieve the latter alternative an operative connection, schematically illustrated by phantom line 251, may be completed, at the will of the operator, between the component 38 and the switch 32.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A lubricating arrangement, comprising a source of lubricant; pump means connected with and adapted to draw lubricant from said source; lubricant receiving means; conduit means connected with said pump means and with said lubricant receiving means for conveying lubricant drawn from said source by said pump means; pressure tank means connected to said conduit means for storing lubricant under pressure each time said pump means supplies lubricant from said source; motor means drivingly connected with said pump means; means for actuating said motor means so that the pump means conveys lubricant through said conduit means and into said tank means whenever said motor means are actuated; normally closed valve means provided in said conduit means intermediate said lubricant receiving means and said pressure tank means; and an operative connection between said valve means and said actuating means for opening said valve means and for permitting a continuous flow of lubricant from said pressure tank means to said lubricant receiving means when said motor means drives said pump means.

2. An arrangement as set forth in claim 1, wherein said lubricant receiving means comprises a first and a second component one of which is normally held against movement by the other component, said one component being movable with respect to said other component when lubricant is admitted between said components in response to opening of said valve means.

3. A lubricating arrangement for movable means performing a predetermined motion, comprising, in combination, a source of lubricant; pump means connected with and adapted to draw lubricant from said source; conduit means connected with said pump means and with said movable means; pressure tank means mounted in said conduit means and adapted to store lubricant under pressure when said pump means draws lubricant from said source; motor means drivingly connected with said pump means so that said pump means urges lubricant through said conduit means into said tank means and to said movable means, when said motor means is actuated; normally closed valve means provided in said conduit means intermediate said movable means and said pressure tank means; and control means actuated in synchronism with the motion of said movable means and operatively connected to said valve means for opening said valve means and for permitting flow of lubricant from said pressure tank means to said movable means in impulses at selected stages of said predetermined motion, and operatively connected to said motor means for actuating the same simultaneously with opening of said valve means.

4. A lubricating arrangement as set forth in claim 3 and adapted to lubricate additional movable means, including additional conduit means connected with said pump means and said additional movable means; and pressure responsive valve means provided in said additional conduit means intermediate said pump means and said additional movable means for delivering lubricant to said additional movable means each time the pressure of lubricant upstream of said valve means reaches a predetermined limit.

5. A lubricating arrangement, particularly one for delivering lubricant in a different manner to each of a plurality of lubricant receiving means, comprising a source of lubricant; first and second lubricant receiving means; conduit means connecting said source with said lubricant receiving means; pressure tank means connected to said conduit means upstream of one of said lubricant receiving means and arranged to accommodate a permanent supply of lubricant and normally to continuously deliver lubricant from said supply to said one lubricant receiving means; pump means connected to said conduit means and arranged to draw lubricant from said source and to convey the lubricant to said pressure tank means and to the other lubricant receiving means; motor means drivingly connected to said pump means for operating said pump means whenever said motor means are actuated; and actuating means for actuating said motor means at predetermined intervals so that lubricant will be delivered to said pressure tank means to replenish the supply therein and to the other of said lubricant receiving means at such intervals.

6. A lubricating arrangement as set forth in claim 5, wherein said first lubricant receiving means comprises movable means for performing a repetitive motion, and wherein said actuating means are operatively connected to said movable means so that said motor means will be actuated in synchronism with the motion of said movable means.

7. A lubricating arrangement as set forth in claim 5, wherein said actuating means comprise adjustable timer means arranged to actuate said motor means at predetermined intervals of time.

8. A lubricating arrangement, particularly one for delivering lubricant in a different manner to each of a plurality of lubricant receiving means, comprising a source of lubricant; first and second lubricant receiving means; first and second conduit means connecting said source, respectively, with said first and second lubricant receiving means; pressure tank means connected with said first conduit means intermediate said source and said first lubricant receiving means and arranged to accommodate a supply of lubricant and normally to continuously deliver lubricant from said supply to said first lubricant receiving means; pump means connected to said conduit means and arranged to draw lubricant from said source and to convey the lubricant through said first conduit means to said pressure tank means to replenish the supply therein, and simultaneously through said second conduit means to said second lubricant receiving means; motor means drivingly connected with said pump means; and means for actuating said motor means at predetermined intervals so that lubricant will be delivered through said first and second conduit means simultaneously at said predetermined intervals, said first lubricant receiving means receiving lubricant from said pressure tank means even during said predetermined intervals when no lubricant is delivered by said pump means to said second lubricant receiving means.

References Cited by the Examiner

UNITED STATES PATENTS

| | | | |
|---|---|---|---|
| 1,955,109 | 4/1934 | Zerk | 184—7 |
| 1,968,000 | 7/1934 | Wupper | 184—7 |
| 2,049,343 | 7/1936 | Warren | 308—9 |
| 2,276,145 | 3/1942 | Bijur | 184—7 |
| 2,597,137 | 5/1952 | Tear | 184—7 |
| 2,667,235 | 1/1954 | Le Clair | 184—7 |
| 2,742,978 | 4/1956 | Peterson et al. | 184—7 |
| 2,851,995 | 9/1958 | Westcott | 188—170 X |
| 2,868,584 | 1/1959 | Faust | 184—56 |
| 3,008,484 | 11/1961 | Conan | 137—568 X |

LAVERNE D. GEIGER, *Primary Examiner.*

MILTON KAUFMAN, *Examiner.*